United States Patent
Bruno et al.

(12) 
(10) Patent No.: US 6,619,908 B2
(45) Date of Patent: Sep. 16, 2003

(54) AXIAL AND RADIAL SEAL ARRANGEMENT

(75) Inventors: Vittorio Bruno, Mississauga (CA); Andreas Eleftheriou, Woodbridge (CA)

(73) Assignee: Pratt & Whitney Canada Corp., Longueuil (CA)

( * ) Notice: Subject to any disclaimer, the term of this patent is extended or adjusted under 35 U.S.C. 154(b) by 34 days.

(21) Appl. No.: 09/950,518

(22) Filed: Sep. 10, 2001

(65) Prior Publication Data

US 2003/0049118 A1 Mar. 13, 2003

(51) Int. Cl.[7] ............................................. F01D 11/02
(52) U.S. Cl. .................. 415/1; 415/230; 415/171.1; 415/174.5
(58) Field of Search .................. 415/1, 230, 170.1, 415/171.1, 174.5, 175; 277/347, 412

(56) References Cited

U.S. PATENT DOCUMENTS

| | | | |
|---|---|---|---|
| 3,791,657 A | * 2/1974 | Bilski | .......................... 277/347 |
| 3,910,651 A | 10/1975 | Pearce et al. | .................. 308/26 |
| 4,375,906 A | 3/1983 | Roberts et al. | |
| 4,420,161 A | * 12/1983 | Miller | ......................... 277/418 |
| 4,453,722 A | 6/1984 | Swanson | ..................... 277/89 |
| 4,754,984 A | * 7/1988 | Keba | ........................... 277/350 |
| 5,211,535 A | 5/1993 | Martin et al. | |
| 5,403,019 A | 4/1995 | Marshall | |
| 6,139,019 A | * 10/2000 | Dinc et al. | .................. 277/347 |
| 6,196,790 B1 | 3/2001 | Sheridan et al. | |

* cited by examiner

*Primary Examiner*—Edward K. Look
*Assistant Examiner*—Kimya N McCoy
(74) *Attorney, Agent, or Firm*—Wayne H. Yan; Ogilvy Renault (PWC)

(57) ABSTRACT

A method and apparatus carrying the method for sealing a radial gap between coaxial inner and outer rotating shafts of a gas turbine engine includes using a radial seal as a main seal to seal the gap for a normal engine operation condition, and using an axial seal as a back-up seal for a double seal of the gap. The radial seal provides a seal which meets relatively restrictive leakage requirements for the normal engine operation condition and the axial seal provides a back-up seal which meets less restrictive leakage requirements but is much more tolerant of radial displacement and vibration between the coaxial inner and outer rotating shafts. Thus, an engine operable condition is ensured under abnormal conditions, such as bird strikes, in which the coaxial relationship between the inner and outer rotating shafts are affected by unbalancing forces caused by the bird strike, thereby causing a failure of the radial seal. The inter-shaft axial and radial seal arrangement according to the present invention has a very simple structure which is convenient and economical to manufacture and maintain.

11 Claims, 2 Drawing Sheets

AXIAL AND RADIAL SEAL ARRANGEMENT

FIELD OF THE INVENTION

This invention relates to a seal arrangement for a gas turbine engine and more particularly to a seal arrangement for an inter-shaft seal that seals between coaxial rotor shafts in a multiple spool gas turbine engine.

BACKGROUND OF THE INVENTION

A front bearing compartment in a multiple spool gas turbine engine is filled with an oil mist to lubricate bearings that support coaxial low pressure and high pressure rotor shafts. The low pressure rotor shaft is driven by a low pressure turbine exposed to hot exhaust gases from the combustor to drive a low pressure compressor and/or propeller. The high pressure rotor shaft is driven by a high pressure turbine upstream of the low pressure turbine and immediately adjacent to the combustor, and serves to drive the high pressure stage compressor immediately upstream of the combustor. The coaxial low and high pressure rotor shafts are separated by a gap filled with working medium gas. The working medium gas is warmer than the temperature inside the bearing compartment. An inter-shaft seal controls the amount of working medium gas leaking into the oil compartment and prevents the oil mist from leaking out of the compartment into the gap.

Flying birds are a danger to aircraft, particularly when they collide with the aircraft and are ingested into the propeller and compressor area of the gas turbine engine. During a bird strike the low pressure rotor shaft can be deflected beyond its operating limits. In order to compensate for the excess deflection of the low pressure rotor shaft and thereby avoid the resulting inter-shaft rubbing, the gap between the coaxial low and high pressure rotor shafts increases accordingly. Efforts have been made to improve bearings which have a combination of properties to allow normal running of the engine as well as allowing safe engine operation during unplanned rotor imbalances, such as those occurring as a result of bird strikes. Examples of such bearings are described in U.S. Pat. No. 5,433,584, issued to Amin et al. on Jul. 18, 1995, and U.S. Pat. No. 4,375,906, issued to Roberts et al. on Mar. 8, 1983.

During a bird strike event, the sealing of the bearing compartments at the shaft interfaces cannot be maintained unless another bearing or a bumper is added at the location of the sealing, to minimize the deflection. In order to solve this problem, U.S. Pat. No. 6,196,790, issued to Sheridan et al. on Mar. 6, 2001, for example, describes a complex seal assembly for an inter-shaft seal in a gas turbine engine. The seal assembly includes a first seal that seals to a seal plate on an inner rotor shaft, a second seal that seals to a seal plate on an outer rotor shaft, and an intermediate seal that is supported by a stator assembly and seals to the first seal and the second seal. The seal assembly accommodates relative radial and axial displacement between the inner and outer shafts. However, in order to provide this freedom of displacement, the mechanism is relatively complex and would appear to be rather expensive to manufacture and maintain. The individual seals of this seal assembly in combination, provide the inter-shaft seal. The seal assembly however, will fail if any of the individual seals malfunctions.

U.S. Pat. No. 5,403,019, issued to Marshall on Apr. 4, 1995, as another example, describes a free floating labyrinth ring seal to seal against a rotatable shaft to control excessive leakage of gas between high and low pressure chambers such as in a turbo machine. The seal includes an elastomeric ring-shaped body with spaced opposing high and low pressure walls and a labyrinth seal surface extending therebetween for sealing with the shaft. The walls have portions defining opposing surfaces of unequal area for pressure-balancing against each other within the cavity with a controlled gas flow clearance between the seal body and the walls of the cavity so that the seal body is substantially free to float with vibration of the shaft while maintaining close tolerance sealing between the labyrinth surface and the shaft as the latter rotates. This seal permits relative axial movement as well as relative radial movement to a limited degree. The seal is designed to float within a groove of a housing. The undercutting of the outside shaft with the groove to accommodate the sliding seal would appear to somewhat undermine the structural integrity of the shaft, as well as introducing mechanical complexity if such a configuration is used for an inter-shaft seal.

Therefore, there is a need for a seal arrangement for inter-shaft sealing in a gas turbine engine which is simply configured and meets seal leakage requirements for normal engine operating conditions, while also ensuring engine operability when a rotor unbalancing event occurs.

SUMMARY OF THE INVENTION

One object of the present invention is to provide a seal arrangement between coaxial inner rotating and outer rotating shafts of a gas turbine engine to ensure a working condition during both normal engine operation and during abnormal engine operation when a rotor unbalancing event occurs.

It is another object of the present invention to provide a seal arrangement between coaxial inner rotating and outer rotating shafts of a gas turbine engine which includes main and backup seals to provide a double seal function.

It is a further object of the present invention to provide a simple configuration of a seal arrangement between coaxial inner rotating and outer rotating shafts of a gas turbine engine.

In accordance with one aspect of the present invention, a method of sealing a radial gap between coaxial inner rotating and outer rotating shafts of a gas turbine engine is provided. The method comprises steps of using a main seal to seal the gap and using a back-up seal for a double seal of the gap. The main seal meets leakage requirements for a normal engine operation condition, and the back-up seal meets leakage requirements which ensures an engine operable condition in abnormal events. In such abnormal events the coaxial relationship between the inner rotating and outer rotating shafts is affected by the events during the engine operation, thereby causing a failure of the main seal.

The back-up seal is preferably adapted to accommodate relative radial displacement between the inner rotating and outer rotating shafts. Nevertheless, leakage requirements for the back-up seal are less preferably restrictive than leakage requirements for the main seal. A radial seal between an outer surface of the inner rotating shaft and an inner surface of a outer rotating shaft, according to one embodiment of the present invention, is used to act as the main seal, and an axial seal between an annular radial surface of the inner rotating shaft and annular radial surface of the outer rotating shaft is used to act as the back-up seal.

In accordance with another aspect of the present invention, an axial and radial seal arrangement is provided for use in a gas turbine engine to seal a radial gap between coaxial inner rotating and outer rotating shafts. The seal arrangement comprises a radial seal and an axial seal. The radial seal is disposed between an outer surface of the inner rotating shaft and an inner surface of the outer rotating shaft, acting as a main seal for a normal operation of the gas turbine engine. The axial seal is disposed between an annular radial surface of the inner rotating shaft and an annular radial surface of the outer rotating shaft, acting as a back-up seal for an abnormal condition in which the radial seal fails.

It is preferable that the axial seal permits a radial displacement between the inner and outer rotating shafts while maintaining seal function when the relative radial displacement causes the failure of the radial seal. In one embodiment of the present invention, the axial seal is disposed between an annular radial end surface of the outer rotating shaft and the annular radial surface on a flange extending radially and outwardly from the outer surface of the inner rotating shaft. The flange is preferably integrated with the inner rotating shaft.

Testing for bird strikes has shown that when a medium bird strike event occurs the deflection of the low pressure rotating shaft caused by the unbalanced rotor is substantially radial and the relative axial displacement between the inner and outer rotating shafts is practically ignorable, in contrast to the relative radial displacement. Therefore, a complex seal assembly which can accommodate relative radial and axial movement simultaneously, is not necessary in order to ensure an operable condition of the gas turbine engine when a medium bird strike event occurs. The present invention advantageously provides a simple configuration of an axial and radial seal arrangement for a double seal of the gap between the coaxial low and high pressure rotor shafts. In the arrangement, the radial seal which is usually better than an axial seal in terms of sealing results, is used for normal engine operation. The radial seal nevertheless, is prone to failure when bird strike events cause rotor imbalance. During such an event, as a back-up seal, the axial seal is much more tolerant than the radial seal and is therefore capable of maintaining an operable seal condition of the gas turbine engine to permit the air craft to continue flight for safe landing.

Other advantages and features of the present invention will be better understood with reference to a preferred embodiment of the present invention described hereinafter.

DETAILED DESCRIPTION OF THE PREFERRED EMBODIMENT

Figure 1:
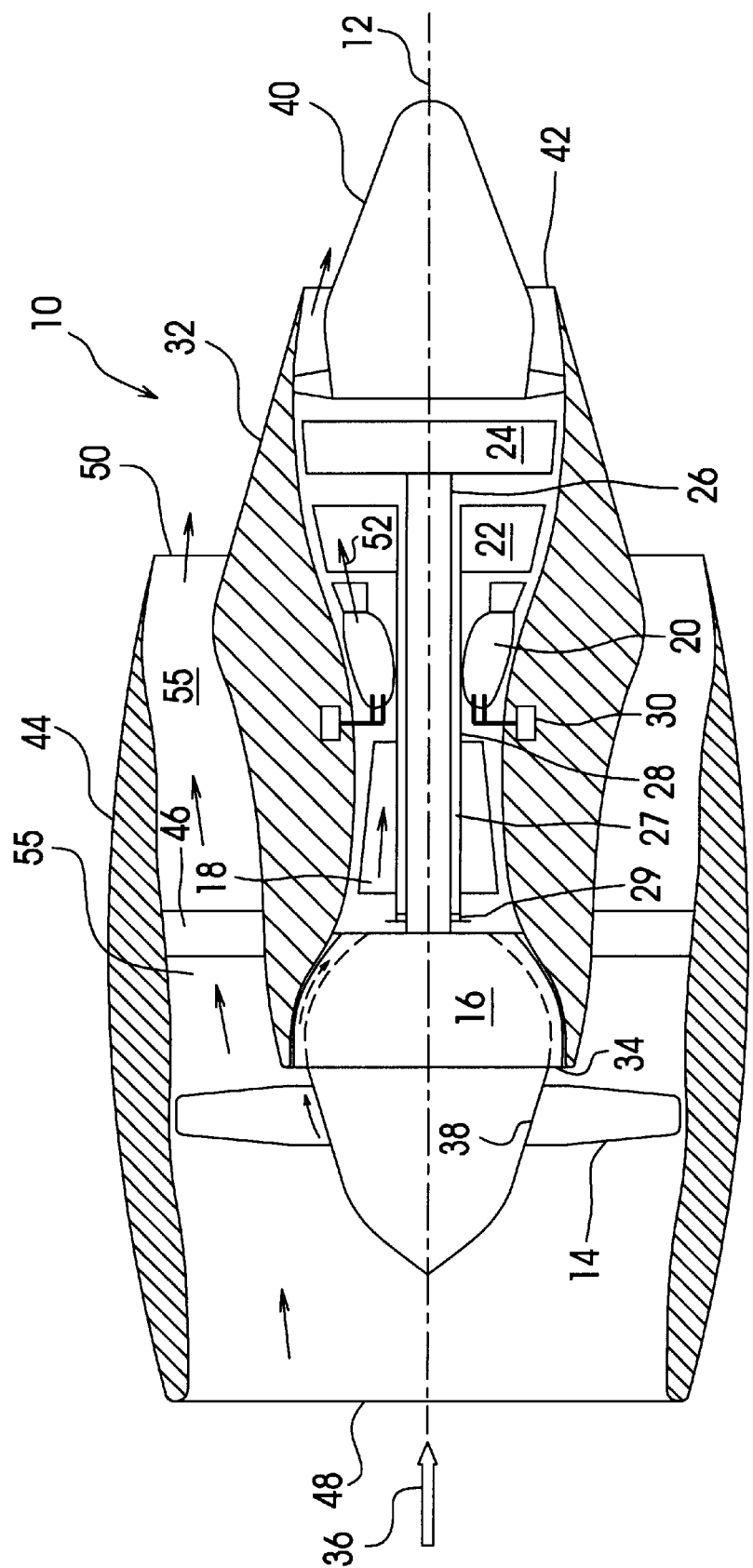
FIG. 1. is a schematic representation of a gas turbine engine for aircraft in cross-sectional view, to show a low pressure rotor in a rotating shaft and low pressure turbine, and a high pressure rotor, outer rotating shaft and high pressure turbine, as well as an inter-shaft seal against the gap between the inner and outer rotating shafts, according to the present invention.
Figure 2:
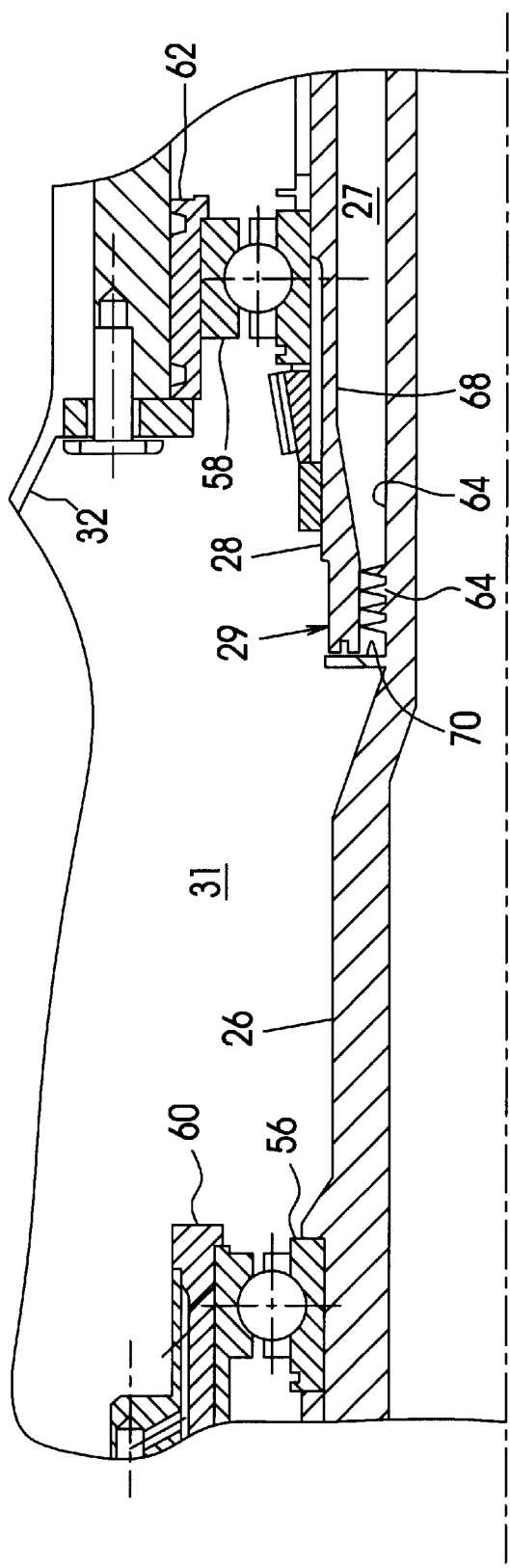
FIG. 2 is a cross-sectional view of the inner and outer rotating shafts, a portion of a bearing compartment and an axial and a radial seal incorporating an embodiment of the present invention.

Referring to the drawings, and more particularly to FIG. 1, an exemplary gas turbine engine 10 for aircraft includes in serial flow communication about a longitudinal centerline axis 12, a fan having a plurality of circumferentially spaced apart fan or rotor blades 14, a conventional low pressure compressor 16, a conventional high pressure compressor 18, a conventional annular combustor 20, a conventional high pressure turbine 22 and a conventional low pressure turbine 24. The low pressure turbine 24 is securely connected to both the low pressure compressor 16 and the fan blades 14 by an inner rotating shaft 26, and the high pressure turbine 22 is securely connected to the high pressure compressor 18 by an outer rotating shaft 28. Conventional fuel injecting means 30 are provided for selectively injecting fuel into the combustor 20 for powering the engine 10. An annular gap 27 is defined between the coaxial inner rotating shaft 26 and the outer rotating shaft 28, and the gap 27 is filled with working medium gas to cool the high and low pressure turbines 22 and 24. An inter-shaft seal 29 is provided to control the amount of working medium gas leaking into a bearing and oil compartment 31 as shown in FIG. 2, and to prevent the oil mist from leaking out of the compartment 31, and into the gap 27.

A conventional annular casing 32 surrounds the engine 10 from the low pressure compressor 16 to the low pressure turbine 24, and defines, with the low pressure compressor 16, a low pressure compressor inlet 34 for receiving a portion of the ambient air 36 thereof. The downstream end of the casing 32 defines with a conventional annular exhaust plug 40, an annular exhaust outlet 42. A portion of the air 36 compressed by the fan blades 14 adjacent to the blade roots 38 is further compressed by the low pressure compressor 16 and the high pressure compressor 18, and is forced into the combustor 20. The mixture of the compressed air 36 and the fuel injected by the fuel injecting means 30 generates combustion gases 52. The combustion gases 52 cause high the pressure turbine 22 and the low pressure turbine 24 to rotate respectively for powering the high pressure compressor 18, the low pressure compressor 16 and the fan blades 14.

Surrounding the blades 14 and the upstream portion of the casing 32 is a nacelle 44 which is spaced radially outwardly from the casing 32 to define with the casing 32, an annular duct 55 for permitting the radially outer portion of the air 36 compressed by the blades to bypass the engine. A plurality of circumferentially spaced stator vanes 46 extend radially between the casing 32 and the nacelle 44, and are spaced apart axially downstream of the blades 14. The nacelle 44 includes an inlet 48 at its upstream end for receiving the ambient air 36, and an outlet 50 for discharging the portion of the air 36 compressed by the blades 14 and passed through the stator vanes 46, for providing a portion of a thrust.

During operation of the engine 10, particularly when the aircraft is taking off or is landing, a bird may collide with the aircraft and enter the inlet 48 of the nacelle 44 under the suction effect produced by the strong air flow 36. A bird entering the nacelle 44 would be stricken by the fan blades 14 as they rotate at a very high rate of speed, which usually causes damage to the fan blades, thereby producing unbalancing forces on the internal rotating shaft 26. The deflection of the internal rotating shaft 26 affected by the unbalancing forces during the bird strike event is a substantially radial displacement or vibration relative the outer rotating shaft 28. A conventional inter-shaft seal between the inner and outer rotating shafts 26, 28 usually requires an accurate coaxial relationship between the inner and outer rotating shafts 26, 28 and would fail when the radial displacement and vibration of the internal rotating shaft 26 relative to the outer rotating shaft 28 occurs, as in the case of a bird strike event.

The failure of the inter-shaft seal between the inner and outer rotating shafts 26, 28 could result in severe safety problems such as engine failure.

Referring now to FIG. 2, the inner rotating shaft 26 is supported in the front bearing and oil compartment 31, by bearings 56 (only one is shown). The front bearing and oil compartment 31 further houses a roller bearing 58 to support the outer rotating shaft 28 at the front end thereof. The bearings 56 and 58 are in turn supported by bearing support assemblies 60, 62 which are housed in the casing 32. The bearing and oil compartment 31 is filled with an oil mist from a suitable source to lubricate and cool the bearings 56 and 58. The working medium gas in the gap 27 is typically much warmer than the temperature inside the front bearing and oil compartment 31.

The inter-shaft seal 29 includes a radial seal 64 disposed between the outer surface 66 of the inner rotating shaft 26 and the inner surface 68 of the outer rotating shaft 28, and acts as a main seal for a normal operation of the gas turbine engine 10. As more clearly shown in FIG. 3, the inter-shaft seal 29 further includes an axial seal 70 disposed between an annular radial surface 72 of a flange 74 extending radially and outwardly from the outer surface 66 of the inner rotating shaft 26, and an annular radial end surface 76 of the outer rotating shaft 28, acting as a back-up seal for an abnormal condition such as a bird strike event.

Figure 3:
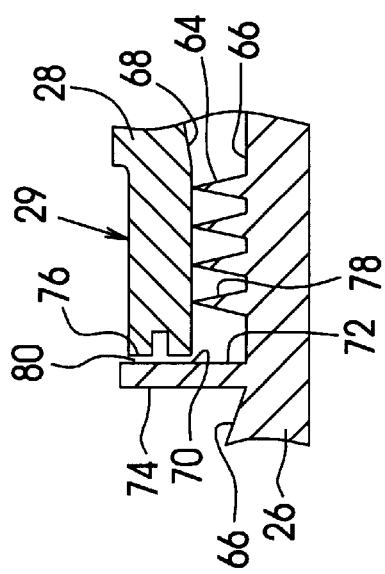
FIG. 3 is a partial cross-sectional view of FIG. 2 in an enlarged scale, showing the details of the inter-shaft seal.

The radial seal 64 is a labyrinth seal which preferably includes a labyrinth seal surface 78 on the outer surface 66 of the inner rotating shaft 26. The labyrinth seal surface 78 sealingly contacts the inner surface 68 of the outer rotating shaft 28. The radial labyrinth seal 64 as illustrated in FIGS. 2 and 3 provides a seal for the inter-shaft gap 27 as shown in FIG. 2, meeting relatively restrictive leakage requirements for a normal engine operation condition. Nevertheless, the radial seal 64 requires an accurate coaxial relationship between the inner and outer rotating shafts 26, 28 in order to provide appropriate seal function.

The axial seal 70, as more clearly shown in FIG. 3, includes a predetermined axial gap 80 between the annular radial surface 72 on the flange 74 of the inner rotating shaft 26 and the annular radial end surface 76 of the outer rotating shaft 28. The predetermined axial gap 80 is very small (exaggerated in FIG. 3 for better illustration) which permits a predetermined fluid leakage therethrough. The predetermined fluid leakage is acceptable for an engine operable condition to preserve engine operability under abnormal conditions such as a bird strike event. The axial seal 70 meets fluid leakage requirements which are less restrictive than those applied to the radial seal 64, nevertheless, the axial seal 70 is much more tolerant of a radial displacement or vibration between the inner and outer rotating shafts 26, 28 while maintaining the seal function even when the relative radial displacement or vibration cause failure of the radial seal 64 so that the axial seal 70, acting as a back-up seal, provides an engine operable condition when the radial seal 64 fails during a bird strike event to ensure the aircraft can continue flight for a safe landing.

The inter-shaft axial and radial seal arrangement for a gas turbine engine according to the present invention has a simple structure. The flange 74 and the labyrinth seal surface 78 are integrated with the inner rotating shaft 26 and are disposed on the outer surface 66 thereof. Such a structure is convenient and economical to manufacture and maintain.

Modifications and improvements to the above-described embodiment of the present invention may become apparent to those skilled in the art. The foregoing description is intended to be exemplary rather than limiting. The scope of the invention is therefore intended to be limited solely by the scope of the appended claims.

We claim:

1. A method of sealing a radial gap between coaxial inner rotating and outer rotating shafts of a gas turbine engine comprising steps of:

using a main seal to seal the gap, meeting leakage requirements for a normal engine operation condition; and using a back-up seal for a double seal of the gap, meeting leakage requirements to ensure an engine operable condition in abnormal events in which the coaxial relationship between the inner and outer rotating shafts are affected by the events during the engine operation, thereby causing a failure of the main seal.

2. The method as claimed in claim 1 wherein the leakage requirements for the main seal are more restrictive than the leakage requirements for the back-up seal.

3. The method as claimed in claim 1 wherein the back-up seal is adapted to accommodate relative radial displacement between the inner rotating and the outer rotating shafts.

4. The method as claimed in claim 1 comprising steps of:

using a radial seal between an outer surface of the inner rotating shaft and an inner surface of the outer rotating shaft to act as the main seal; and using an axial seal between an annular radial surface of the inner rotating shaft and an annular radial surface of the outer rotating shaft to act as the back-up seal.

5. An axial and radial seal arrangement for use in a gas turbine engine to seal a radial gap between coaxial inner rotating and outer rotating shafts, the seal arrangement comprising:

a radial seal disposed between an outer surface of the inner rotating shaft and an inner surface of the outer rotating shaft, acting as a main seal for a normal operation of the gas turbine engine; and an axial seal disposed between an annular radial surface of the inner rotating shaft and an annular radial surface of the outer rotating shaft, acting as a back-up seal for an abnormal condition in which the radial seal fails.

6. The axial and radial seal arrangement as claimed in claim 5 wherein the axial seal permits a radial displacement between the inner rotating and outer rotating shafts while maintaining the seal function when the relative radial displacement causes the failure of the radial seal.

7. The axial and radial seal arrangement as claimed in claim 5 wherein the axial seal is disposed between an annular radial end surface of the outer rotating shaft and an annular radial surface on a flange extending radially and outwardly from the outer surface of the inner rotating shaft.

8. The axial and radial seal arrangement as claimed in claim 7 wherein the flange is integrated with the inner rotating shaft.

9. The axial and radial seal arrangement as claimed in claim 7 wherein the axial seal comprises a predetermined axial gap between the annular radial surface on the flange of the inner rotating shaft and the annular radial end surface of the outer rotating shaft, permitting a predetermined fluid leakage therethrough, which is acceptable for an engine operable condition in abnormal events.

10. The axial and radial seal arrangement as claimed in claim 5 wherein the radial seal comprises a labyrinth seal.

11. The axial and radial seal arrangement as claimed in claim 5 wherein the radial seal comprises a labyrinth seal surface on the outer surface of the inner rotating shaft sealingly contacting the inner surface of the outer rotating shaft.

* * * * *